United States Patent
Naslund et al.

(10) Patent No.: US 10,739,372 B2
(45) Date of Patent: Aug. 11, 2020

(54) DETACHABLE PROBE AND SEALING OF AN INTEGRATED AIR DATA SENSOR

(71) Applicant: Rosemount Aerospace Inc., Burnsville, MN (US)

(72) Inventors: Brian Brent Naslund, Chanhassen, MN (US); Benjamin John Langemo, Shakopee, MN (US); Matthew Paul Anderson, Burnsville, MN (US); Andrew Sherman, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 183 days.

(21) Appl. No.: 16/009,780

(22) Filed: Jun. 15, 2018

(65) Prior Publication Data

US 2019/0383849 A1    Dec. 19, 2019

(51) Int. Cl.
*G01P 5/165*    (2006.01)
*G01P 13/02*    (2006.01)

(52) U.S. Cl.
CPC ............ *G01P 13/025* (2013.01); *G01P 5/165* (2013.01)

(58) Field of Classification Search
None
See application file for complete search history.

(56) References Cited

U.S. PATENT DOCUMENTS

| | | |
|---|---|---|
| 2,488,810 A | 11/1949 | Easterday |
| 5,639,964 A | 6/1997 | Djorup |
| 6,622,390 B2 | 9/2003 | Brusius |
| 6,761,057 B2 | 7/2004 | Cronin et al. |
| 7,490,510 B2 | 2/2009 | Agami et al. |
| 7,581,426 B2 | 9/2009 | Gilday |
| 9,080,903 B2 * | 7/2015 | Ashton ................... G01P 5/165 |
| 9,211,961 B2 | 12/2015 | Madhavanpillai et al. |

(Continued)

FOREIGN PATENT DOCUMENTS

| | | |
|---|---|---|
| CN | 104386256 A | 3/2015 |
| CN | 205262673 U | 5/2016 |

(Continued)

OTHER PUBLICATIONS

Extended European Search Report for EP Application No. 19180677.7, dated Sep. 17, 2019, pp. 6.

(Continued)

*Primary Examiner* — Peter J Macchiarolo
*Assistant Examiner* — Jermaine L Jenkins
(74) *Attorney, Agent, or Firm* — Kinney & Lange, P.A.

(57) ABSTRACT

A system includes a probe and a transducer. The probe is detachable and includes a mount having an outlet of a first gas path extending through the probe and a protrusion extending away from the mount. The transducer is configured to mate with the mount and includes a sealing feature adjacent an inlet of the second gas path in fluid communication with the first gas path. When the mount of the probe is adjacent the transducer, the protrusion interacts with the sealing feature such that the sealing feature is in an open position to allow air to flow from the first gas path into the second gas path. When the mount of the probe is distant from the transducer, the sealing feature is in a closed position to prevent contaminants from entering the second gas path.

15 Claims, 3 Drawing Sheets

(56) References Cited

U.S. PATENT DOCUMENTS

| | | |
|---|---|---|
| 9,366,555 B2 | 6/2016 | Schober et al. |
| 9,909,905 B2 * | 3/2018 | Wong .................... G01P 13/025 |
| 10,040,570 B2 | 8/2018 | Heuer et al. |
| 2012/0008882 A1 | 1/2012 | Justice et al. |
| 2016/0033546 A1 | 2/2016 | Ashton |
| 2017/0108360 A1 | 4/2017 | Wong et al. |
| 2018/0038720 A1 | 2/2018 | Wohlford |

FOREIGN PATENT DOCUMENTS

| | | |
|---|---|---|
| CN | 106018866 A | 10/2016 |
| CN | 205982315 U | 2/2017 |
| DE | 102011110061 A1 | 2/2013 |
| EP | 3156803 A1 | 4/2017 |
| FR | 2993357 A1 | 1/2014 |
| WO | WO2013028220 A1 | 2/2013 |

OTHER PUBLICATIONS

Extended European Search Report for EP Application No. 19180636.3, dated Sep. 17, 2019, pp. 6.

* cited by examiner

DETACHABLE PROBE AND SEALING OF AN INTEGRATED AIR DATA SENSOR

FIELD OF THE INVENTION

The present invention relates to integrated air data sensors and, in particular, to a detachable probe and a sealing feature to prevent contaminants from entering a transducer of the integrated air data sensor when the probe is detached from the transducer.

BACKGROUND

An integrated air data sensor is commonly utilized on aircrafts to measure air data parameters such as airspeed, altitude, angle of attack, angle of sideslip, and temperature and can be utilized to collect other aircraft spatial data. The integrated air data sensor is one interconnected component with a portion of the integrated air data sensor being exposed to the environment and a portion of the integrated air data sensor being housed within a fuselage of the aircraft. The portion of the integrated air data sensor exposed to the environment can require replacement due to wear or damage from environmental effects. Because the integrated air data sensor is one interconnected component and the components cannot typically be separated while installed on the aircraft, the entire integrated air data sensor is removed and replaced with another complete unit when one portion of the system becomes damaged and/or malfunctions. Replacement of the integrated air data sensor can be costly, particularly if the aircraft must be taken out of service during the repairs.

SUMMARY

An integrated air data sensor includes a transducer and a probe operably attachable to the transducer by a sealing feature such that a first gas path defined by the probe is fluidically coupled to a second gas path defined by the transducer via an inlet to the second gas path when the probe is attached to the transducer and the inlet is blocked from fluid flow therethrough when the probe is not attached to the transducer.

A system includes a probe and a transducer. The probe is detachable and includes a first gas path extending through the probe, a head having ports forming an inlet to the first gas path, and a mount having an outlet of the first gas path and a protrusion extending away from the mount at a location adjacent to the outlet. The transducer is configured to mate with the mount and includes a second gas path with an inlet configured to be in fluid communication with the outlet of the first gas path when the transducer is mated with the mount, at least one sensor along the second gas path, and a sealing feature adjacent the inlet of the second gas path. When the mount of the probe is adjacent the transducer, the protrusion interacts with the sealing feature such that the sealing feature is in an open position to allow air to flow from the first gas path into the second gas path. When the mount of the probe is distant from the transducer, the sealing feature is in a closed position to prevent contaminants from entering the second gas path.

A method of protecting a gas path of a transducer of an integrated air data sensor when a probe of the integrated air data sensor is removed includes detaching the probe from the transducer with the probe defining a first gas path that is in fluidic communication with a second gas path defined by the transducer via an inlet of the second gas path when the probe is attached to the transducer and sealing the inlet to fluid flow there through in response to the detaching.

DETAILED DESCRIPTION

An integrated air data sensor that is commonly used on an aircraft is disclosed herein. This system includes a probe that is detachable from a transducer such that, when the probe has been damaged or is malfunctioning, the probe can be easily swapped out for an undamaged, functioning probe. The integrated air data sensor includes a gas path extending from ports in the probe to sensors in the transducer. To prevent contaminants from entering the gas path in the transducer when the probe is detached from (i.e., not abutting) the transducer, the transducer includes a sealing feature that is configured to move into a closed position in which the sealing feature plugs the gas path in the transducer. When the probe is abutting the transducer, the probe includes a protrusion that extends downward away from the probe and is configured to push the sealing feature into an open position in which environmental air is able to flow from the gas path in the probe into the gas path in the transducer. Thus, the disclosed integrated air data sensor both allows for replacement of the probe, and implores measurement accuracy by preventing contaminants from entering the gas path in the transducer. An integrated air data sensor that allows for replacement of the probe without having to replace the entire integrated air data sensor reduces cost and downtime because the replacement of the probe can be done on-wing without removal and replacement of the entire integrated air data sensor that will take the aircraft out of service for a longer duration.

Figure 1A:
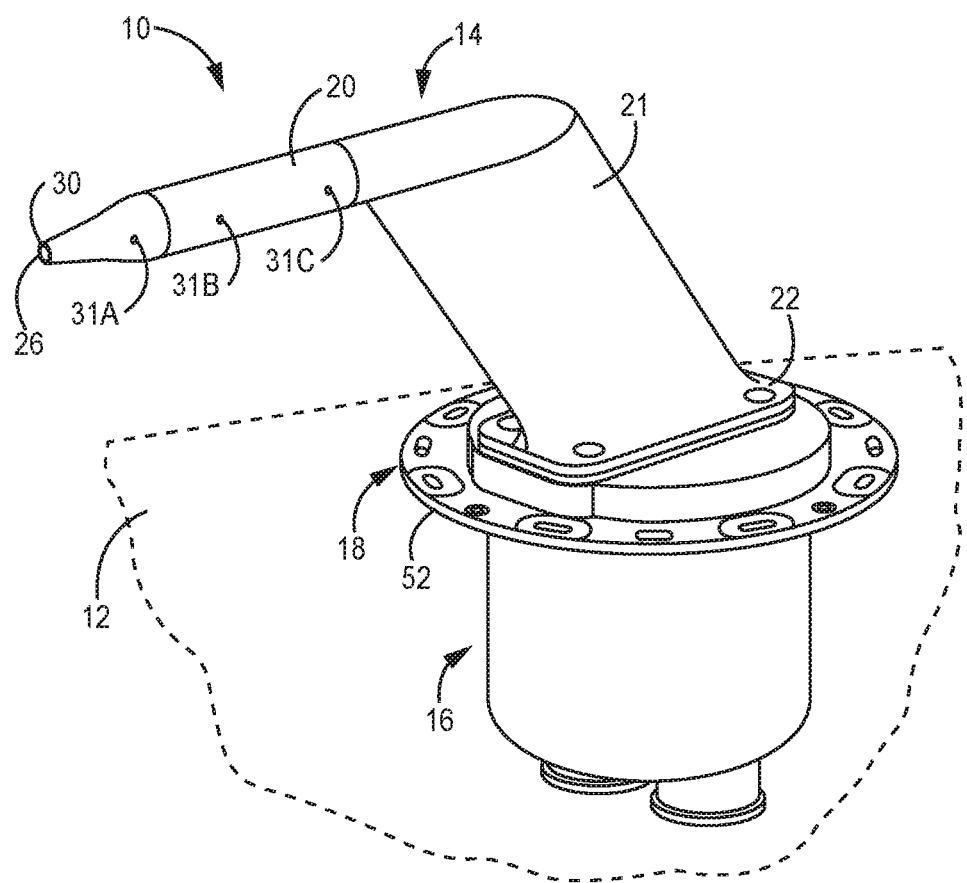
FIG. 1A is a perspective view of an integrated air data sensor.
Figure 1B:
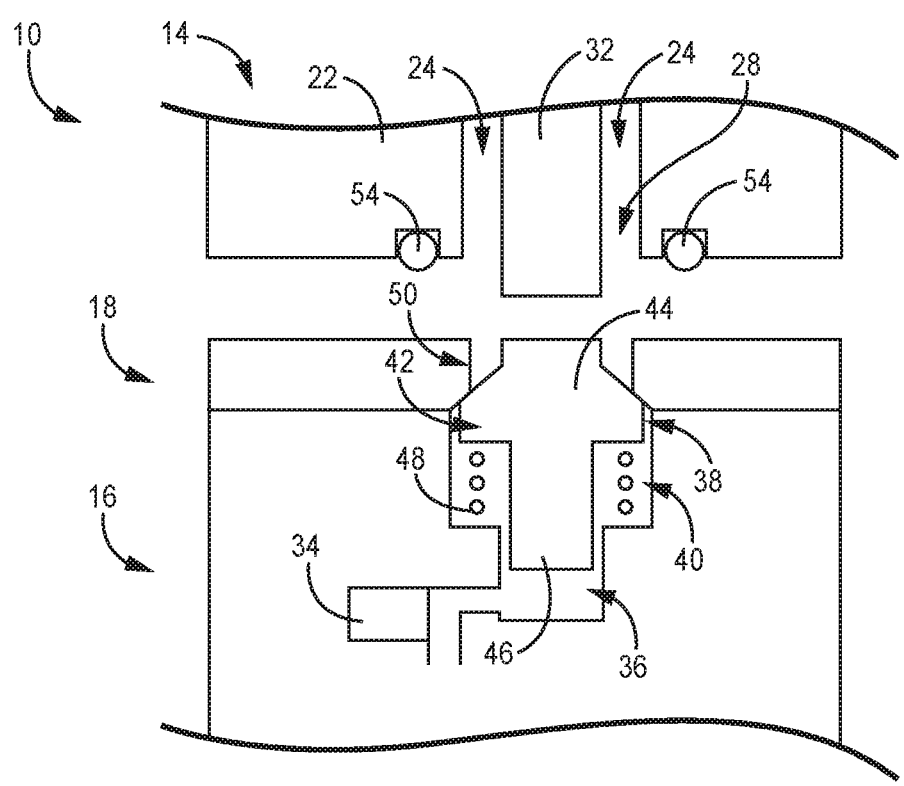
FIG. 1B is an enlarged view of an interface between a probe and a transducer in the integrated air data sensor of FIG. 1A.

FIG. 1A is a perspective view of an integrated air data sensor on an aircraft, and FIG. 1B is an enlarged view of an interface between a probe and a transducer in the integrated air data sensor of FIG. 1A. As shown in FIG. 1A, integrated air data sensor 10 is on aircraft 12 and includes probe 14, transducer 16, and faceplate 18. Probe 14 includes head 20, strut 21, base 22, inlet 26 of first gas path 24 at port 30, and side ports 31A-31C. As shown in FIG. 1B, probe 14 also includes protrusion 32 and outlet 28 of first gas path 24. As shown in FIG. 1B, transducer 16 includes sensors 34, second gas path 36 with inlet 38, and sealing feature 40. Sealing feature 40 includes plunger 42 (with plunger frustum 44 and cylinder 46) and resilient member 48. Faceplate 18 includes opening 50 and flange 52. O-ring 54 is a seal between probe 14 and faceplate 18 (or transducer 16 if faceplate 18 is not present).

In the disclosed embodiments, integrated air data sensor 10 is utilized on aircraft 12 and can determine environmental conditions such as static pressure or impact pressure as well as other information, such as speed and orientation of the aircraft. The entire system as shown in FIG. 1A is disclosed herein as integrated air data sensor 10, while individual sensors as subcomponents of integrated air data sensor 10 are disclosed as sensors 34. As shown in FIG. 1A, transducer 16 is housed within a fuselage of aircraft 12 while probe 14 is outside the fuselage and exposed to environmental conditions. Faceplate 18 can form the interface between probe 14 and transducer 16 to protect transducer 16. While integrated air data sensor 10 is described in this disclosure as being utilized on aircraft 12, integrated air data sensor 10 can be utilized anywhere and/or on any vehicle to measure and record environmental conditions and/or collect other information. Further, a data measurement and collection system can include multiple integrated air data sensors 10 working together (or having redundant systems), and integrated air data sensor 10 can interact with and convey information to other systems on aircraft 12, another vehicle/system in which integrated air data sensor 10 is a part, or to systems remote from integrated air data sensor 10. Integrated air data sensor 10 can include other components not expressly described in this disclosure.

Probe 14 is configured to be exposed to the environment and includes components for conveying environmental air to sensors 34 in transducer 16. In FIG. 1A, probe 14 is shown with a substantially cylindrical head 20 and an elongated rectangular strut 21, and a flat rectangular base 22 perpendicular to strut 21. However, probe 14 can have other configurations suitable to convey environmental air to transducer 16. Probe 14 can include various attachment features that allow for probe 14 to be attached to and detached from transducer 16 (and/or faceplate 18 covering transducer 16), such as screws, bolts, glue, welds, braze, or other means. As shown, probe 14 is attached to transducer 16 at base 22 by bolts.

Head 20 of probe 14 can be substantially cylindrical with a frustoconical tip. Head 20 includes port 30 at the tip and side ports (31A-31C) being in the sides of head 20 and forming an inlet to other gas paths that may be similar to or different from first gas path 24. Port 30 is an opening/orifice that extends from a surface of head 20 into an interior of head 20 and forms inlet 26 to first gas path 24. First gas path 24 is a channel extending through probe 14 between inlet 26 in head 20 and outlet 28 in base 22. First gas path 24 conveys environmental conditions, such as air with a pressure of the atmosphere in which probe 14 is located, to transducer 16 and, more particularly, to second gas path 36 (which in turn conveys environmental air to sensors 34). While probe 14 is shown as only having one first gas path 24, probe 14 can be configured to have multiple gas paths that convey environmental air to multiple sensors 34 in transducer 16 (and therefore, integrated air data sensor 10 can include multiple interfaces having multiple protrusions 32 corresponding to multiple sealing features 40).

Strut 21 and base 22 (also collectively referred to as a mount in this disclosure) provide structural support to head 20 and are configured to connect probe 14 to transducer 16 and/or faceplate 18. Strut 21 can have any shape but, as shown in FIG. 1A, is an elongated, substantially rectangular shape that is thicker in the middle and gradually reduces thickness at both front and rear ends to be more aerodynamic. Strut 21 includes a portion of first gas path 24 extending through strut 21 between head 20 and base 22. Base 22 can be a flange with mounting features to allow for probe 14 to be attached to and detachable from transducer 16 and includes a portion of first gas path 24. Additionally, base 22 can have various grooves or other features to allow for probe 14 to be sealed to transducer 16 and/or faceplate 18, such as a groove to accommodate O-ring 54 (as shown in FIG. 1B).

Base 22 includes protrusion 32 that extends away from base 22 at a location adjacent outlet 28 of first gas path 24 to interact with sealing feature 40 of transducer 16. Protrusion 32 is a projection adjacent to first gas path 24 and, as shown in FIG. 1A, can be located within first gas path 24. Other configurations of protrusion 32 can have protrusion 32 located abutting a wall of first gas path 24 or otherwise incorporated into base 22. Protrusion 32 can have any cross-sectional shape, such as circular (so that protrusion 32 is a cylinder). Protrusion 32 can extend away from base 22 any length, but should be sufficiently long to contact sealing feature 40 to push plunger 42 downward into an open position when base 22 is abutting transducer 16 and/or faceplate 18 to allow air to flow from first gas path 24 into second gas path 36. Protrusion 32 can have other sizes, shapes, and/or configurations suitable to move sealing feature 40 into the open position when probe 14 is abutting transducer 16 and/or faceplate 18.

Transducer 16 is configured to mate with base 22 of probe 14 and, as shown in FIG. 1A, can be a cylindrical shape that includes second gas path 36, at least one sensor 34, and sealing feature 40. Transducer 16 can include other components, such as a controller that includes a computer processor capable of recording and analyzing information measured by sensor 34 (as well as other functions). Transducer 16 can be located within and protected from the environment by a fuselage of aircraft 12 with faceplate 18 providing a protective covering to transducer 16 and being situated between base 22 and transducer 16. Second gas path 36 extends at least partially through transducer 16 from inlet 38 at least to sensors 34. When probe 14 is attached to transducer 16, second gas path 36 is in fluid communication with outlet 28 of first gas path 24. Second gas path 36 conveys environmental air from first gas path 24 in probe 14 to sensor 34. Second gas path 36 can have any cross-sectional shape and, depending on sealing feature 40, can have configurations suited to seal with sealing feature 40 to prevent air and contaminants from entering second gas path 36 when probe 14 is not abutting transducer 16 and/or faceplate 18 (i.e., when sealing feature 40 is in a closed position). While transducer 16 is shown as only having one second gas path 36, transducer 16 can be configured to have multiple gas paths that convey environmental air to multiple sensors 34. Further, transducer 16 can have other configurations that are not expressly disclosed.

Sensors 34 can be within transducer 16 and are located along second gas path 36. Transducer 16 can include more than one sensor 34 with multiple sensors located along second gas path 36 and/or along multiple gas paths extending through/into transducer 16. Sensors 34 are configured to measure environmental pressures which are used by transducer 16 to determine characteristics of the environment and/or aircraft 12, such as air pressure, altitude, airspeed, angle of attack, and other data of aircraft 12.

Sealing feature 40 is at inlet 38 of second gas path 36 and is configured to move between the open position and the closed position. The open position occurs when probe 14 is abutting transducer 16 such that protrusion 32 is in contact with sealing feature 40 to allow air to flow from first gas path 24 into second gas path 36. The closed position occurs when probe 14 is not abutting transducer 16 such that protrusion 32 is distant from sealing feature 40 and sealing feature 40 is positioned to seal second gas path 36 to prevent contaminants from entering second gas path 36 in transducer 16. As will be described with regards to FIGS. 1B, 2, and 3, sealing feature 40 can have a variety of configurations for sealing second gas path 36 at inlet 38 while also allowing environmental air to pass through second gas path 36 to sensors 34 when probe 14 is abutting transducer 16 and/or faceplate 18.

Sealing feature 40 includes plunger 42 within second gas path 36 adjacent inlet 38. Plunger 42 is configured to be moveable within second gas path 36 and can have any configuration able to seal second gas path 36 when in the closed position and allow air to flow through second gas path 36 when in the open position. As shown in FIG. 1B, plunger 42 includes plunger frustum 44, which is a frustoconical shaped component inlet 38 (when in the closed position), and cylinder 46, which is connected to plunger frustum 44 (downward from plunger frustum 44) and can be coaxial with second gas path 36. Plunger frustum 44 and walls of second gas path 36 are configured to contact one another when in the closed position to seal second gas path 36, with the walls also being configured to ensure plunger 42 remained within inlet 38 of second gas path 36 by angling inward into second gas path 36 to provide a lip that prevents resilient member 48 from pushing plunger 42 upward out of second gas path 36. Adjacent to cylinder 46 is resilient member 48, which can surround plunger frustum 44 and is configured to bias plunger 42 into the closed position by pushing on a bottom side of plunger frustum 44. Resilient member 48 is also able to be compressed when plunger frustum 44 is pushed by protrusion 32 downward into the open position in which plunger frustum 44 is not in contact with the lip of the walls of second gas path 36 and air is able to flow around plunger 42 and through second gas path 36. Resilient member 48 can be any expandable component that is able to bias plunger 42 upwards to contact the walls of second gas path 36 to seal second gas path 36 while also being compressible to allow for downward movement of plunger 42 when plunger 42 is pushed upon by protrusion 32. As shown in FIG. 1B, resilient member 48 is a spring.

Integrated air data sensor 10 can include faceplate 18 between probe 14 and transducer 16 to provide a protective covering for transducer 16. Faceplate 18 can be made from a variety of materials suitable for withstanding the environment. Faceplate 18 includes opening 50 that is coaxial with inlet 38 of second gas path 36 and outlet 28 of first gas path 24 (when probe 14 is abutting transducer 16 and/or faceplate 18). Faceplate 18 can be fastened to transducer through a variety of means, including screws, bolts, welds, braze, glue, or another fastener. Faceplate 18 can also include flange 52 that allows for faceplate 18 to be fastened to aircraft 10.

As described above, sealing feature 40 with plunger 42 as shown in FIG. 1B is configured to be biased upward by resilient member 48 to the closed position to seal inlet 38 of second gas path 36 when probe 14 (and protrusion 32) are not abutting transducer 16, and plunger 42 is configured to be pushed downward by protrusion 32 into the open position to allow air to flow from first gas path 24 into second gas path 36 (between the walls of second gas path 36 and plunger 42) when probe 14 is abutting transducer 16. Such a configuration allows for sealing of second gas path 36 to prevent air and contaminants from entering second gas path 36 when probe 14 is detached from transducer 16 while also allowing for environmental air to flow through second gas path 36 to sensors 34 when probe 14 is abutting transducer 16 and protrusion 32 is pushing plunger 42 into the open position. As described with regards to FIGS. 2 and 3, integrated air data sensor 10 can include other configurations of sealing feature 40.

Figure 2:
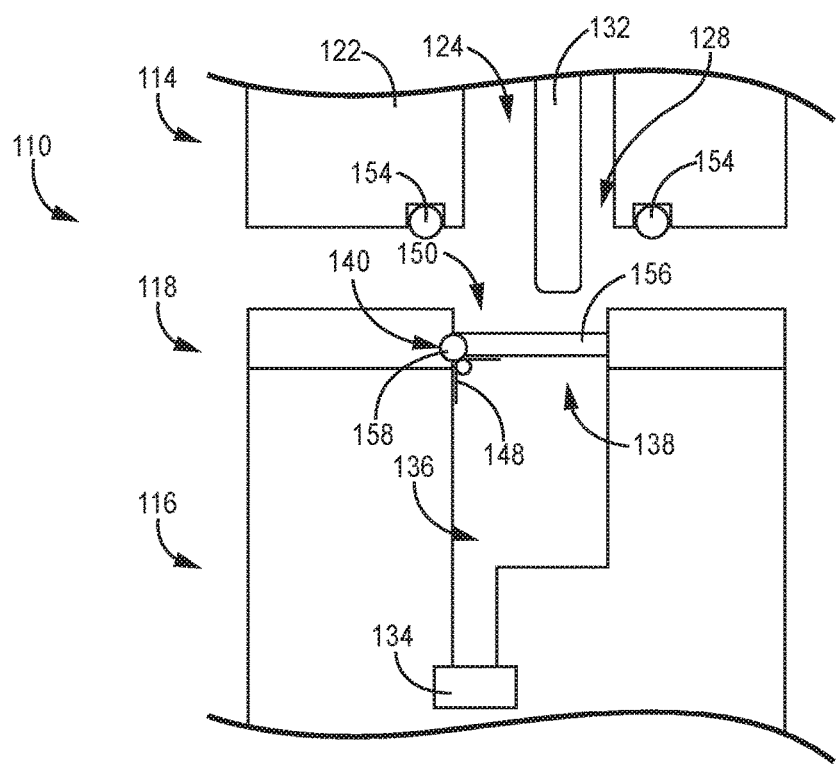
FIG. 2 is an enlarged view of another embodiment of the interface.

FIG. 2 is an enlarged view of another embodiment of the interface between a probe and transducer in the integrated air data sensor. Integrated air data sensor 110 includes probe 114 having base 122, first gas path 124 with outlet 128, and protrusion 132. Integrated air data sensor 110 also includes transducer 116 having sensors 134, second gas path 136, and sealing feature 140 with flap 156, hinge 158, and resilient member 148. Integrated air data sensor 110 can also include faceplate 118 having opening 150 and flange 52. O-ring 154 can be between probe 114 and faceplate 118. Except for sealing feature 140 (and possibly protrusion 132), the components of integrated air data sensor 110 are similar in functionality and configuration to those of integrated air data sensor 10 in FIGS. 1A and 1B.

Sealing feature 140 is configured to move between a closed position and an open position. The closed position occurs when probe 114 is not abutting transducer 116 and/or faceplate 118 (so protrusion 132 is distant from flap 156) such that flap 156 extends horizontally across inlet 138 of second gas path 136 to seal second gas path 136 by preventing air and contaminants from flowing into second gas path 136. The open position occurs when probe 114 is abutting transducer 116 and/or faceplate 118 such that protrusion 132 pushes flap 156 downward to allow air to flow into second gas path 136 from first gas path 124. To move from the closed position to the open position, flap 156 pivots about hinge 158, which is connected to a wall/side of second gas path 136. When in the closed position, flap 156 is biased into the closed/horizontal position by resilient member 148, which abuts flap 156. Resilient member 148 can be a spring that is expandable to push flap 156 into the closed position while also being compressible to allow for flap 156 to pivot into the open position when pushed by protrusion 132. Protrusion 132 can be any size, shape, location, and/or orientation suitable to push flap 156 into the open position when probe 114 is abutting transducer 116 and/or faceplate 118 to allow for air to flow into second gas path 136 from first gas path 124. Flap 156 can have a cross-sectional shape that matches a cross-sectional shape of inlet 138 of second gas path 136 (or opening 150 of faceplate 118 if flap 156 and hinge 158 are located within opening 150). In FIG. 2, flap 156 and second gas path 136 at inlet 138 both have a cross-sectional shape that is a circle. Hinge 158 can have any configuration that allows flap 156 to pivot between the open and closed positions, such as a pin extending through clasps.

Figure 3:
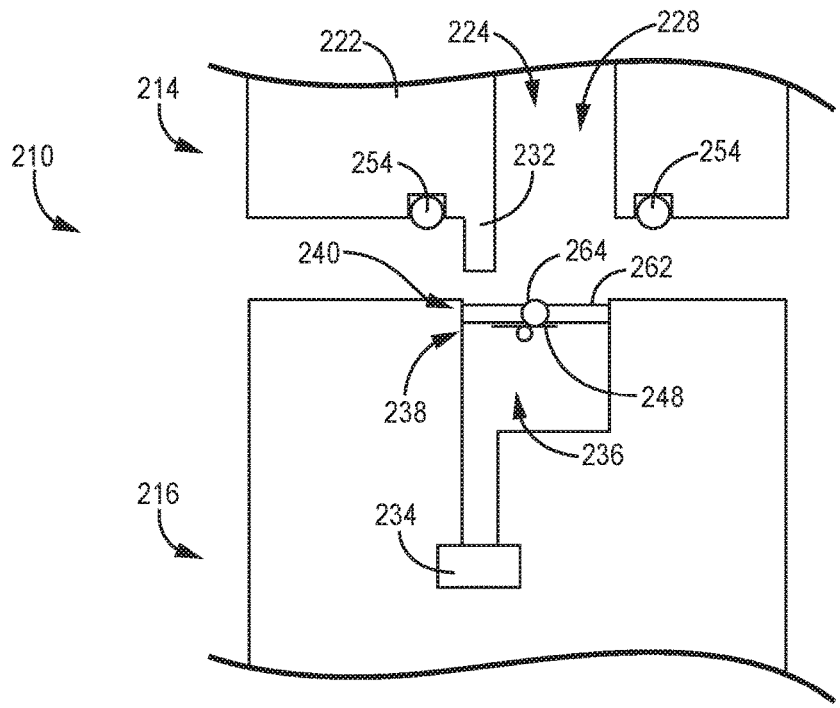
FIG. 3 is an enlarged view of a third embodiment of the interface.

FIG. 3 is an enlarged view of a third embodiment of the interface between a probe and transducer in the integrated air data sensor. Integrated air data sensor 210 includes probe 214 having base 222, first gas path 224 with outlet 228, and protrusion 232. Integrated air data sensor 210 also includes transducer 216 having sensors 234, second gas path 236, and sealing feature 240 with butterfly valve 240 (which has disk 262 and pin 264). O-ring 254 can be between probe 214 and transducer 216. Except for sealing feature 240 and protrusion 232, the components of integrated air data sensor 210 are similar in functionality and configuration to those of integrated air data sensor 10 in FIGS. 1A and 1B.

Sealing feature 240 is configured to move between a closed position and an open position. The closed position occurs when probe 214 is not abutting transducer 216 (so protrusion 232 is distant from disk 262) such that disk 262 of butterfly valve 240 extends horizontally across inlet 238 of second gas path 236 to seal second gas path 236 by preventing air and contaminants from flowing into second gas path 236. The open position occurs when probe 214 is abutting transducer 216 such that protrusion 232 pushes disk 262 of butterfly valve 240 to pivot about pin 264 so disk 262 is no longer horizontal to allow air to flow into second gas path 236 from first gas path 224. To move from the closed position to the open position, disk 262 pivots about pin 264, which is connected to at least one wall/side of second gas path 236. When in the closed position, disk 262 of butterfly valve 240 is biased into the closed/horizontal position by resilient member 248, which abuts disk 262. Resilient member 248 can be a spring that is expandable to push disk 262 into the closed position while also being compressible to allow for disk 262 to pivot into the open position when pushed by protrusion 232. Protrusion 232 can be any size, shape, location, and/or orientation suitable to push disk 262 into the open position when probe 214 is abutting transducer 216 to allow for air to flow into second gas path 236 from first gas path 224. As shown in FIG. 3, protrusion 232 does not extend about a center of first gas path 224 and instead is connected to a side of first gas path 224 so protrusion 232 contacts and pushes disk 262 without contacting pin 264. Disk 262 of butterfly valve 240 can have a cross-sectional shape that matches a cross-sectional shape of inlet 238 of second gas path 236. Disk 262 and pin 264 can have any configuration that allows for butterfly valve to pivot between the open and closed positions, such as a pin that extends through clasps or another configuration.

Integrated air data sensor 10/110/210 includes probe 14/114/214 that is detachable from transducer 16/116/216 such that, when probe 14/114/214 has been damaged or is malfunctioning, probe 14/114/214 can be easily swapped out for an undamaged, functioning probe 14/114/214. Integrated air data sensor 10/110/210 also includes sealing feature 40/140/240 of transducer 16/116/216, which prevents contaminants from entering second gas path 36/136/236 of transducer 16/116/216 when probe 14/114/214 is detached from transducer 16/116/216. Thus, the disclosed integrated air data sensor 10/110/210 both allows for replacement of probe 14/114/214, and implores measurement accuracy by preventing contaminants from entering transducer 16/116/216. Integrated air data sensor 10/110/210 allowing for replacement of probe 14/114/214 without having to replace the entire integrated air data sensor 10/110/210 reduces cost and downtime because the replacement of probe 14/114/214 can be done without the need for aircraft 12 to go into a maintenance hangar or otherwise be taken out of operation.

Discussion of Possible Embodiments

The following are non-exclusive descriptions of possible embodiments of the present invention.

An integrated air data sensor includes a transducer and a probe operably attachable to the transducer by a sealing feature such that a first gas path defined by the probe is fluidically coupled to a second gas path defined by the transducer via an inlet to the second gas path when the probe is attached to the transducer and the inlet is blocked from fluid flow therethrough when the probe is not attached to the transducer.

An integrated air data sensor includes a probe and a transducer. The probe includes a probe head, a probe base, a first gas path extending within the probe, a port in the probe head that forms an entrance to the first gas path, and a protrusion adjacent to an exit of the first gas path extending away from the probe base. The transducer is configured to mate with the probe base and includes a second gas path with an entrance aligned with the exit of the first gas path, at least one sensor along the second gas path, and a sealing feature at the entrance of the second gas path. The probe is detachable from the transducer, and the protrusion of the probe is configured to push the sealing feature into an open position when the probe is abutting the transducer to allow air to flow from the first gas path into the second gas path. The sealing feature is configured to move into a closed position to seal the second gas path when the probe is not abutting the transducer.

The integrated air data sensor of the preceding paragraph can optionally include, additionally and/or alternatively, any one or more of the following features, configurations and/or additional components:

The sealing feature further includes a plunger within the second gas path adjacent the inlet to the second gas path, a resilient member abutting the plunger with the resilient member configured to bias the plunger to the closed position in which the plunger prevents contaminants from entering the second gas path and a protrusion adjacent to an outlet to the first gas path, wherein when the probe is abutting the transducer the protrusion pushes the plunger into the open position such that air is able to flow by the plunger and into the second gas path.

The plunger includes a frustoconical portion that extends outward to contact sides of the second gas path when the plunger is in the closed position.

The plunger includes a cylindrical portion connected to the frustoconical portion and coaxial with the second gas path, the cylindrical portion being adjacent to the resilient member.

The resilient member is a spring.

The sealing feature further includes a flap adjacent the inlet to the second gas path, a hinge connecting the flap to a side of the second gas path, and a resilient member abutting the flap, the resilient member configured to bias the flap to the closed position such that the flap prevents air and contaminants from entering the second gas path, wherein when the probe is adjacent the transducer the protrusion pushes the flap into the open position such that air is able to flow by the flap and into the second gas path.

A cross-sectional shape of the second gas path at the inlet is a circle and a cross-sectional shape of the flap is a circle.

The sealing feature further includes a butterfly valve adjacent the inlet to the second gas path with the butterfly valve having a disk corresponding to a cross-sectional shape of the second gas path and a pin forming a pivot about which the disk rotates and a resilient member abutting the disk with the resilient member configured to bias the disk to the closed position in which the butterfly valve prevent contaminants from entering the second gas path, wherein when the probe is adjacent the transducer the protrusion pushes the disk of the butterfly valve into the open position such that air is able to flow by the disk and into the second gas path.

An aircraft comprising the disclosed integrated air data sensor.

The probe is exposed to the environment and the transducer is within a fuselage of the aircraft.

A system includes a probe and a transducer. The probe is detachable and includes a first gas path extending through the probe, a head having ports forming an inlet to the first gas path, and a mount having an outlet of the first gas path and a protrusion extending away from the mount at a location adjacent to the outlet. The transducer is configured to mate with the mount and includes a second gas path with an inlet configured to be in fluid communication with the outlet of the first gas path when the transducer is mated with the mount, at least one sensor along the second gas path, and a sealing feature adjacent the inlet of the second gas path. When the mount of the probe is adjacent the transducer, the protrusion interacts with the sealing feature such that the sealing feature is in an open position to allow air to flow from the first gas path into the second gas path. When the mount of the probe is distant from the transducer, the sealing feature is in a closed position to prevent contaminants from entering the second gas path.

The system of the preceding paragraph can optionally include, additionally and/or alternatively, any one or more of the following features, configurations and/or additional components:

The sealing feature further includes a plunger at the inlet of the second gas path with the plunger being configured to be pushed into the open position by the protrusion of the probe when the mount of the probe is abutting the transducer and a resilient member abutting the plunger and configured to bias the plunger into the closed position when the protrusion of the probe is distant from the plunger.

The resilient member is a spring.

The sealing feature further includes a flap at the inlet of the second gas path, a hinge connecting the flap to the transducer with the hinge configured to pivot to allow the protrusion to push the flap into the open position when the mount of the probe is abutting the transducer, and a resilient member abutting the flap and configured to bias the flap to the closed position to prevent contaminants from entering the second gas path.

The sealing feature further includes a butterfly valve at the inlet of the second gas path with the butterfly valve having a disk corresponding to a cross-sectional shape of the second gas path and a pin about which the disk is configured to pivot to allow the protrusion to push the disk into the open position when the mount of the probe is abutting the transducer and a resilient member abutting the disk and configured to bias the disk to the closed position to prevent contaminants from entering the second gas path.

The first gas path has a circular cross-sectional shape at the outlet and the protrusion is within the first gas path and extends outward from the outlet of the first gas path.

A method of protecting a gas path of a transducer of an integrated air data sensor when a probe of the integrated air data sensor is removed includes detaching the probe from the transducer with the probe defining a first gas path that is in fluidic communication with a second gas path defined by the transducer via an inlet of the second gas path when the probe is attached to the transducer and sealing the inlet to fluid flow there through in response to the detaching.

The method of the preceding paragraph can optionally include, additionally and/or alternatively, any one or more of the following features, configurations, steps, and/or additional components:

Sealing the inlet of the transducer further includes biasing a plunger of a sealing feature at the inlet to the second gas path to a closed position using a resilient member abutting the plunger.

Sealing the inlet of the transducer further includes rotating a flap of a sealing feature at the inlet to the second gas path about a hinge connecting the flap to a side of the second gas path to a closed position.

Sealing the inlet of the transducer further rotating a butterfly valve of a sealing feature at the inlet to the second gas path about a pivot to a closed position.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An integrated air data sensor comprising:
   a transducer;
   a probe operably attachable to the transducer by a sealing feature such that a first gas path defined by the probe is fluidically coupled to a second gas path defined by the transducer via an inlet to the second gas path when the probe is attached to the transducer and the inlet is blocked from fluid flow therethrough when the probe is not attached to the transducer; and
   the sealing feature comprises:
      a plunger within the second gas path adjacent the inlet to the second gas path;
      a first resilient member abutting the plunger, the first resilient member configured to bias the plunger to the closed position in which the plunger prevents contaminants from entering the second gas path; and
      a protrusion adjacent to an outlet to the first gas path,
   wherein when the probe is abutting the transducer the protrusion pushes the plunger into the open position such that air is able to flow by the plunger and into the second gas path.

2. The integrated air data sensor of claim 1, wherein the plunger includes a frustoconical portion that extends outward to contact sides of the second gas path when the plunger is in the closed position.

3. The integrated air data sensor of claim 2, wherein the plunger includes a cylindrical portion connected to the frustoconical portion and coaxial with the second gas path, the cylindrical portion being adjacent to the resilient member.

4. The integrated air data sensor of claim 1, wherein the first resilient member is a spring.

5. An aircraft comprising the integrated air data sensor of claim 1.

6. The aircraft of claim 5, wherein the probe is exposed to the environment and the transducer is within a fuselage of the aircraft.

7. An integrated air data sensor comprising:
   a transducer;
   a probe operably attachable to the transducer by a sealing feature such that a first gas path defined by the probe is fluidically coupled to a second gas path defined by the transducer via an inlet to the second gas path when the probe is attached to the transducer and the inlet is blocked from fluid flow therethrough when the probe is not attached to the transducer; and
   the sealing feature comprises:
      a flap adjacent the inlet to the second gas path;
      a hinge connecting the flap to a side of the second gas path; and
      a first resilient member abutting the flap, the first resilient member configured to bias the flap to the closed position such that the flap prevents air and contaminants from entering the second gas path,
   wherein when the probe is adjacent the transducer the protrusion pushes the flap into the open position such that air is able to flow by the flap and into the second gas path.

8. The integrated air data sensor of claim 7, wherein a cross-sectional shape of the second gas path at the inlet is a circle and a cross-sectional shape of the flap is a circle.

9. An aircraft comprising the integrated air data sensor of claim 7.

10. The aircraft of claim 9, wherein the probe is exposed to the environment and the transducer is within a fuselage of the aircraft.

11. The integrated air data sensor of claim 7, wherein the first resilient member is a spring.

12. An integrated air data sensor comprising:

a transducer;

a probe operably attachable to the transducer by a sealing feature such that a first gas path defined by the probe is fluidically coupled to a second gas path defined by the transducer via a first inlet to the second gas path when the probe is attached to the transducer and the first inlet is blocked from fluid flow therethrough when the probe is not attached to the transducer; and the sealing feature comprises:

a butterfly valve adjacent the first inlet to the second gas path, the butterfly valve having a disk corresponding to a cross-sectional shape of the second gas path and a pin forming a pivot about which the disk rotates; and a first resilient member abutting the disk, the first resilient member configured to bias the disk to the closed position in which the butterfly valve prevent contaminants from entering the second gas path, wherein when the probe is adjacent the transducer the protrusion pushes the disk of the butterfly valve into the open position such that air is able to flow by the disk and into the second gas path.

13. An aircraft comprising the integrated air data sensor of claim 12.

14. The aircraft of claim 12, wherein the probe is exposed to the environment and the transducer is within a fuselage of the aircraft.

15. The integrated air data sensor of claim 12, wherein the first resilient member is a spring.

* * * * *